INVENTORS
JOHN FRANCIS MACKENZIE &
THEODORE HORROCKS

INVENTORS
JOHN FRANCIS MACKENZIE &
THEODORE HORROCKS

Patented July 28, 1953

2,647,253

UNITED STATES PATENT OFFICE 2,647,253

ELECTRICAL SIGNALING SYSTEM

John Francis Mackenzie and Theodore Horrocks, Liverpool, England, assignors to Automatic Telephone & Electric Company Limited, Liverpool, England, a British company Application June 6, 1950, Serial No. 166,520
In Great Britain June 30, 1949

7 Claims. (Cl. 340—310)

The present invention relates to electrical signalling systems and is more particularly concerned with systems involving the application of high frequency signals to electric supply mains for the purpose of operating a number of responding devices connected thereto at different points. By high frequency is meant high compared with the frequency of the supply and in practice a frequency within the audio range is found most effective. Systems of this type already find considerable application in the centralised control of street lights, domestic water heaters, and the like. The invention is specifically concerned with equipment for use at the controlling point in systems in which the superimposed currents are interrupted at regular intervals so that for any one signalling frequency a number of distinctive signals can be obtained depending upon the periodicity of the interruptions.

Hitherto signalling in such systems has generally been effected by interrupting the connection of the high frequency generator to the network by means of electro-mechanical switches of heavy current-carrying capacity, but due to the mechanical and magnetic inertia of these switches a limitation is imposed on the number of distinctive signals which can be made available with a signalling period of reasonable length. It has also been proposed to make use of an electronic impulsing scheme but this has not hitherto been entirely satisfactory owing to difficulties resulting from ionisation and de-ionisation of the control tubes at ripple frequency. The chief object of the present invention is to provide an improved method of switching whereby the disadvantages mentioned above are overcome.

According to the invention, in an electrical signalling system for superimposing high frequency signalling currents on an electric supply network in the form of coded pulses in order to effect the operation of responding devices connected thereto at a plurality of points, the high frequency generator is connected to the network in a circuit including a saturable reactor the impedance of which is adapted to be varied by varying the flow of direct current through a biasing winding.

The invention will be better understood from the following description of various methods of carrying it into effect which should be read in conjunction with the accompanying drawings.

Figure 1:
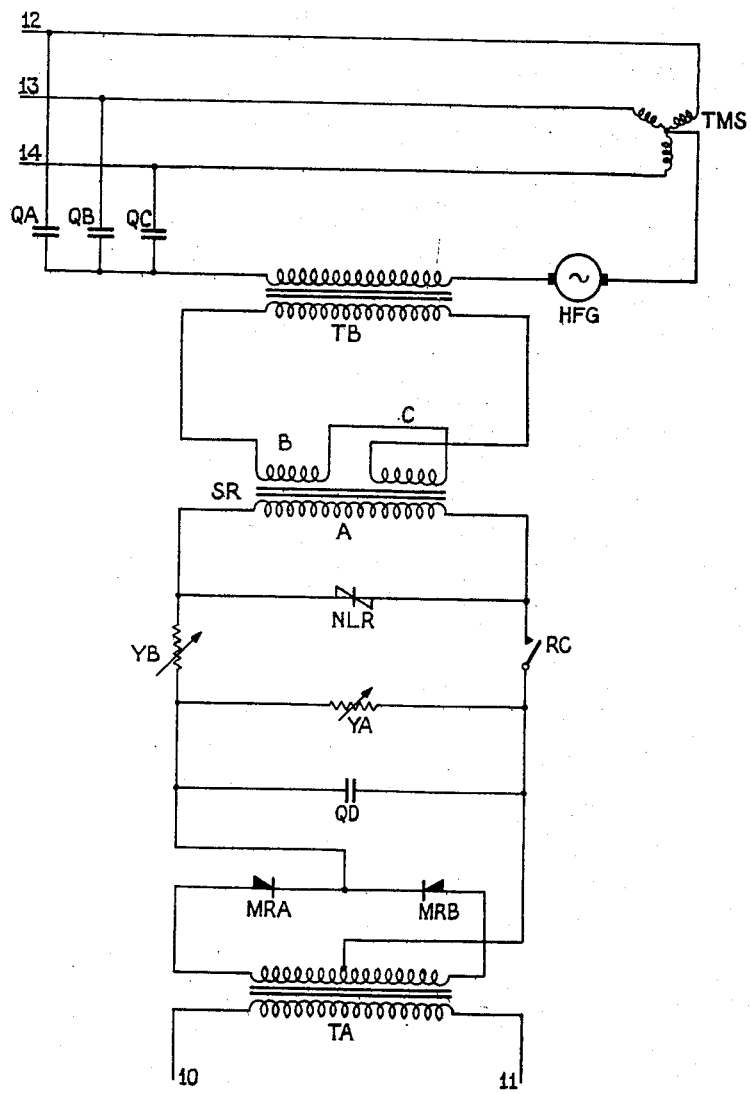
Figure 2:
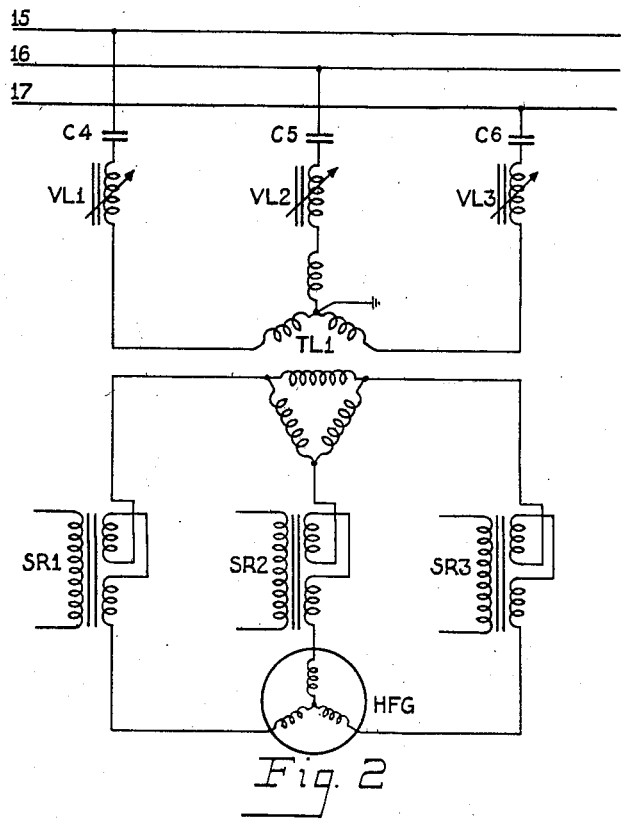
Figure 3:
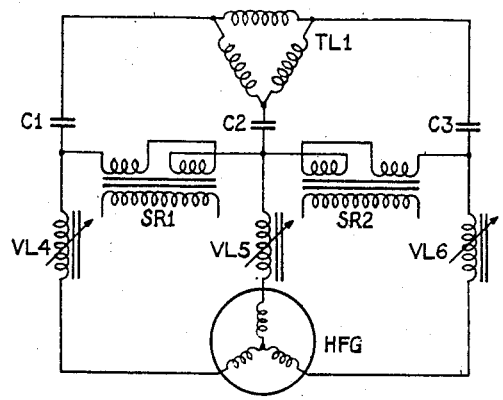

Of the drawings, Fig. 1 shows the circuit arrangements of a method of injecting control signals on to the L. T. feeders of the electric supply mains using a single-phase high frequency generator. Figs. 2 and 3 show two alternative methods of injecting control signals on to the H. T. feeders using a three-phase generator.

Referring to Fig. 1, an alternating current supply for instance derived from the low tension three-phase mains 12, 13 and 14, is fed to the transformer TA by way of leads 10 and 11, and the voltage stepped down to a suitable value which may be of the order of 30 volts. The rectifiers MRA and MRB effect full-wave rectification, and capacitor QD connected across the output provides the necessary smoothing. The shunt and series variable resistors YA and YB are included to permit adjustment of the impedance of the direct current source thus derived. A non-linear resistor NLR, which may take the form of a disc of silicon carbide material known commercially under the name "Atmite" is connected in shunt with the control winding A of the saturable reactor SR to limit surge currents in the D. C. circuit. The series-connected windings B and C of the saturable reactor are coupled to the high frequency signalling path by means of the impedance-matching transformer TB. High frequency signalling current is obtained from a single-phase alternator HFG, one side of which extends over the normally high impedance secondary winding of transformer TB and the star point formed by capacitors QA, QB and QC to the main low tension feeders 12, 13 and 14. The other side of the alternator connects with the neutral point of the mains supply transformer TMS.

It should be noted that transformer TB has been included from purely practical considerations and, providing the saturable reactor is suitably designed, the transformer may be dispensed with and windings B and C of the saturable reactor connected in series with the alternator HFG.

A very small current is required to produce saturation flux in the core of the reactor SR and furthermore surges in the D. C. circuit are minimised by the inclusion of the non-linear resistor NLR. Consequently the interrupting means R. C., which is arranged to close and open the D. C. circuit repetitively when it is required to apply signals to the feeders, may comprise light duty contacts of the motor-driven cam-operated type. Moreover other interrupting means may well be employed, for example, contacts controlled by a mechanical oscillating element or by an electronic timing device. Again contacts of a mechanical type may be replaced by an electronic switching device. The rate of actuation of the interrupting means is chosen in accordance with the signal to be transmitted, and may be of the order of 3 to 12 times per second. It will be appreciated that this latter figure is considerably higher than that hitherto obtainable by interrupting means of the usual type having appreciable mechanical and magnetic inertia.

With the interrupting means R. C. in the open position, D. C. excitation of the saturable reactor does not occur and as a result the high impedance of windings B and C of the saturable reactor is reflected into the signalling path by transformer TB. Consequently only a negligible amount of signal frequency current is transmitted to the feeders when no direct current is flowing. However, each time contacts R. C. are closed, the core of the reactor becomes saturated and the impedance of windings B and C is reduced to allow a greatly increased signal frequency current to flow. Compared with the amount of current flowing in the signalling path during the periods of saturation of the reactor, the amount flowing during the complementary periods is virtually equivalent to a complete interruption. It will be seen therefore that pulses of effective high frequency signalling current transmitted to the feeders correspond to pulses in the D. C. circuit. The envelope of the high frequency signal may be adjusted by means of the variable resistors YA and YB.

It may be mentioned that the saturable reactor is preferably provided with a three-limbed core, the D. C. biasing winding being on the centre limb and the A. C. windings connected in series on the outer limbs. With this arrangement high frequency currents are not induced into the D. C. circuit and in any event there is no low frequency current flow in the circuit of the high frequency generator.

It will be seen that the foregoing method of injection has limitations in that a single-phase high frequency generator is used, the signals circulating in the A. C. conductors being therefore in phase and also virtually limited to the particular L. T. network to which connection is made. It may be desired to signal over a larger network involving H. T. feeders supplying one or more L. T. networks and for this purpose injection directly into H. T. feeders may be the best arrangement. A circuit showing the application of the saturable reactor method of control to three-phase H. T. feeder injection is given in Fig. 2. This circuit like that already described provides for the so-called series method of control.

A three-phase high frequency generator HFG connects with the L. T. winding of a star-delta line isolation transformer TLI via a circuit comprising the A. C. windings of the saturable reactors SR1, SR2 and SR3. The H. T. winding of transformer TLI connects with the high tension supply conductors 15, 16 and 17 via a circuit comprising the tuning inductors VL1, VL2 and VL3 and the H. T. coupling capacitors C4, C5 and C6. The D. C. control circuit of the saturable reactors may be similar to that shown in Fig. 1, and if need be, matching transformers may be included. Three-phase signalling currents extend to line whenever the cores of the saturable reactors are saturated by D. C. excitation. Tuning on the high tension side of the isolation transformer serves to reduce the flow of mains frequency current to a negligible value.

The relevant elements of an arrangement similar to that just described but employing the so-called shunt method of control are shown in Fig. 3. Here again the D. C. control circuits may be similar to those described with reference to Fig. 1. The A. C. windings of the saturable reactors SR1 and SR2 are connected across phases of the signalling path and hence only two reactors are required. These windings retain a high impedance while the cores remain unsaturated, and under these circumstances signalling currents extend to the feeders over the tuned circuits comprising tuning inductors VL4, VL5 and VL6, and capacitors C1, C2 and C3. Each time the reactors are saturated, the A. C. windings constitute low impedance shunt paths for the signal currents which then circulate in the local circuits involving the inductors VL4, VL5 and VL6 instead of being applied to the power supply network. It will be appreciated that the method of control illustrated in Fig. 3 requires that the current-carrying capacity of the reactor A. C. windings need only be comparatively small since they are excluded from the signalling path. With this arrangement the impedance provided by inductors VL4, VL5 and VL6 is necessary to keep down the value of the circulating currents and hence tuning is employed also on the high frequency generator side of the isolation transformer.

We claim:

1. An electrical signalling system for operating switching devices connected to polyphase electric supply mains at remote points and responsive to characteristic currents of high frequency superimposed on the mains, comprising a source of high frequency current effectively connected across each phase, saturable reactor means having alternating current and direct current windings, said alternating current windings being connected to modify the high frequency current flow in each phase and means for intermittently applying direct current potential to said saturable reactor means whereby the impedance of said alternating current windings is altered thereby affecting the magnitude of high frequency current supplied to each phase.

2. An electrical signalling system for operating switching devices connected to polyphase electric supply mains at remote points and responsive to characteristic currents of high frequency superimposed on the mains, comprising a high frequency generator, a saturable reactor provided with alternating and direct current windings, circuit arrangements connecting said alternating current windings effectively between said generator and said mains, a source of direct current and an intermittently operable contact device for connecting said direct current source to said direct current winding whereby the impedance of said alternating current windings is altered and the flow of high frequency current from said generator is varied.

3. An electrical signalling system of a type adapted to superimpose high frequency signalling currents onto polyphase electric supply mains thereby to operate switching devices connected to the mains, comprising a high frequency generator connected across each phase, a saturable reactor having alternating current and direct current windings, said alternating current windings being connected to present a series impedance to the high frequency currents, terminals for the direct current windings whereat a source of direct current potential is adapted to be connected to supply said direct current windings and means interposed between said source of direct current potential and said direct current windings for intermittently applying potential to said direct current windings whereby saturation of said reactor reduces the impedance presented to said high frequency currents thereby permitting substantial flow of signalling current to the mains.

4. An electrical signalling system for operating switching devices connected to polyphase electric supply mains at remote points and responsive to signalling currents of high frequency superimposed on the mains, comprising a polyphase high frequency generator, a plurality of saturable reactors each having alternating current and direct current windings, electrical connections including said alternating current windings respectively coupling the high frequency phases to the mains phases, means for supplying direct current potential to each of the direct current windings and switching means interposed between said supplying means and said direct current windings for intermittently applying direct current potential thereto whereby the impedance of said alternating current windings is intermittently reduced to permit substantial signalling current to pass to said mains.

5. The electrical signalling system of claim 4 including means respectively connected between said mains phases and said generator phases to present high impedance to mains current flow.

6. An electrical signalling system for operating switching devices connected to polyphase electric supply mains at remote points and responsive to signalling currents of high frequency superimposed on the mains, comprising a polyphase high frequency generator, electrical connections for extending signalling phase currents to the respective mains, a pair of saturable reactors each having alternating current and direct current windings, said alternating current windings being connected across different pairs of the high frequency generator phases, means for supplying direct current potential to said direct current windings and switching means interposed between said direct current windings and said supplying means for intermittently applying direct current potential thereto whereby the impedance of said alternating current windings is intermittently reduced and said signalling currents are therefore substantially precluded from passing to the mains.

7. The electrical signalling system of claim 6 including means interposed between said alternating current windings and said generator for limiting the high frequency current flow through said windings.

JOHN FRANCIS MACKENZIE.
THEODORE HORROCKS.

References Cited in the file of this patent

UNITED STATES PATENTS

| Number | Name | Date |
| --- | --- | --- |
| 2,021,099 | Fitz Gerald | Nov. 12, 1935 |
| 2,129,920 | Fitz Gerald | Sept. 13, 1938 |
| 2,357,995 | Blomberg et al. | Sept. 12, 1944 |